United States Patent [19]

Schwab

[11] 4,162,165
[45] Jul. 24, 1979

[54] PROCESS FOR THE PRODUCTION OF MICROCAPSULAR COATING COMPOSITIONS CONTAINING PIGMENT PARTICLES AND COMPOSITIONS PRODUCED THEREBY

[75] Inventor: Gerhart Schwab, Chillicothe, Ohio

[73] Assignee: The Mead Corporation, Dayton, Ohio

[21] Appl. No.: 807,250

[22] Filed: Jun. 16, 1977

[51] Int. Cl.$^2$ ............................................. C09D 11/00
[52] U.S. Cl. ..................................... 106/21; 106/14.5; 282/27.5; 427/152; 428/307; 428/327
[58] Field of Search .......................... 106/14.5, 20, 21; 252/316; 282/27.5; 427/152, 214, 222; 428/307, 327, 403

[56] References Cited

U.S. PATENT DOCUMENTS

| | | | |
|---|---|---|---|
| 3,016,308 | 1/1962 | Macaulay | 106/22 X |
| 3,179,600 | 4/1965 | Brockett | 252/316 X |
| 3,336,155 | 8/1967 | Rowe | 252/316 X |
| 3,503,783 | 3/1970 | Evans | 427/214 X |
| 3,943,063 | 3/1976 | Morishita et al. | 427/212 X |

Primary Examiner—Lorenzo B. Hayes
Assistant Examiner—Amelia B. Yarbrough
Attorney, Agent, or Firm—Charles N. Shane, Jr.; Stephen H. Cagle; Wilson G. Palmer

[57] ABSTRACT

This invention relates to a process for the production of hot melt coating compositions containing microcapsules and inorganic pigment particles comprising the following: An aqueous dispersion of microcapsules is prepared. Inorganic pigment particles are added to the aqueous dispersion of the microcapsules and mixed. The dispersion of the microcapsules and the inorganic pigment particles are sprayed into a heated atmosphere, thereby drying the dispersion and producing a free-flowing powder of the microcapsules. The inorganic pigment particles are substantially deposited on and adhered to the microcapsules. The free-flowing powder of the microcapsules having the inorganic pigment particles deposited thereon are then dispersed in a liquid hot melt suspending medium. The liquid hot melt coating composition so produced can be coated on a substrate. The invention further relates to a coating composition comprising microcapsules, from about 0.1% to about 20%, by weight, inorganic pigment particles based on the weight of the microcapsules and a hot melt suspending medium. The inorganic particles are substantially deposited on and adhered to the microcapsules.

13 Claims, No Drawings

PROCESS FOR THE PRODUCTION OF MICROCAPSULAR COATING COMPOSITIONS CONTAINING PIGMENT PARTICLES AND COMPOSITIONS PRODUCED THEREBY

BACKGROUND OF THE INVENTION

1. Field of the Invention

This invention relates to the production of hot melt coating compositions which compositions contain microcapsules and inorganic pigment particles dispersed in a hydrophobic hot melt suspending medium. In a preferred embodiment, these hot melt coating compositions may be applied to a substrate such as paper to produce pressure-sensitive carbonless transfer sheets.

2. Prior Art

It is known from the prior art to use hot melt coatings containing microcapsules for coating substrates such as paper. See, for example, U.S. Pat. No. 3,016,308 (1962) to Macaulay and U.S. Pat. No. 3,079,351 (1963) to Staneslow et al. These patents disclose the use of such coatings in the preparation of pressure-sensitive copying papers.

Pressure-sensitive carbonless copy paper, briefly stated, is a standard type of paper wherein during manufacture the backside of the paper substrate is coated with what is referred to as a CB or transfer coating, the CB coating containing one or more chromogenic materials generally in capsular form. At the same time the front side of the paper substrate is coated during manufacture with what is referred to as a CF coating, which contains one or more chromogenic materials capable of producing a color with the encapsulated CB chromogenic material. Both of the chromogenic materials remain in the coatings on the respective back and front surfaces of the paper in substantially colorless form. This is true until the CB and CF coatings are brought into overlying relationship and sufficient pressure, as by a typewriter, is applied to rupture the CB coating to release the encapsulated chromogenic material. At this time the chromogenic material contacts the CF coating and reacts with the chromogenic material therein to form a colored image. Carbonless copy paper has proved to be an exceptionally valuable image medium for a variety of reasons, only one of which is the fact that until a CB coating is placed next to a CF coating both the CB and CF coatings are in an inactive state as the coreactive elements are not in contact with one another until pressure is applied. Patents relating to carbonless copy paper products are:

U.S. Pat. No. 2,712,507 (1955) to Green
U.S. Pat. No. 2,730,456 (1956) to Green et al
U.S. Pat. No. 3,455,721 (1969) to Phillips et al
U.S. Pat. No. 3,466,184 (1969) to Bowler et al
U.S. Pat. No. 3,672,935 (1972) to Miller et al More recently, improved hot melt systems have been developed which can be used to prepare, for example, pressure-sensitive transfer sheets. Such improved systems are described in commonly-assigned, co-pending U.S. application Ser. No. 747,682, filed Dec. 6, 1976. The improvements described therein involve the use of specified materials, e.g. use of polar waxes and/or hot melt suspending media containing polar groups, in order to improve the dispersion of the microcapsules in the hot melt suspending media. The optional use of opacifying agents, such as titanium dioxide or clay, as an additive to the hot melt is mentioned. It should be noted that in some instances the coating compositions were an off white or light tan colored. This is objectionable particularly where the coating compositions are to be applied to white papers. Efforts to overcome this disadvantage by adding pigment particles to the hot melt coating composition were unsatisfactory due to the formation of lumps of pigment particles which could not be easily dispersed.

The treatment of pigments with various organic compounds to improve their dispersability in coating compositions, both hydrophobic and hydrophilic, is well known in the prior art. A review of some of the patents concerned with this solution to the problem of dispersing pigments is disclosed in U.S. Pat. No. 3,640,792 (1972) to Dietz. Dietz also discloses that a slurry of titanium dioxide can be spray dried in the presence of proton-donating organic compounds, e.g., organic amines and amides. The titanium dioxide so treated can be dispersed in a hydrophobic liquid such as a linseed oil vehicle.

The aforementioned objections and disadvantages can be easily overcome using the process of the present invention in which pigment particles are dispersed in an aqueous dispersion of microcapsules and the dispersion of microcapsules and pigment particles are spray dried to form a fine powder. The powder can then be easily dispersed in the heated hot melt coating composition using low shear mixing to give a smooth coatable composition. Sufficient pigment particles can be introduced in this manner to the hot melt coating composition to mask color of the hot melt suspending media. Furthermore, separate treatment of the pigment particles to improve their dispersability in a hot melt suspending medium is not required.

STATEMENT OF THE INVENTION

This invention relates to a process for the production of hot melt coating compositions containing microcapsules and inorganic pigment particles comprising the following: An aqueous dispersion of microcapsules is prepared. Inorganic pigment particles are added to the aqueous dispersion of the microcapsules and mixed. The dispersion of the microcapsules and the inorganic pigment particles are sprayed into a heated atmosphere, thereby drying the dispersion and producing a free-flowing powder of the microcapsules. The inorganic pigment particles are substantially deposited on and adhered to the microcapsules. The free-flowing powder of the microcapsules having the inorganic pigment particles deposited thereon are then dispersed in a liquid hot melt suspending medium. The liquid hot melt coating composition so produced can be coated on a substrate. The invention further relates to a coating composition comprising microcapsules, from about 0.1% to about 20%, by weight, inorganic pigment particles based on the weight of the microcapsules and a hot melt suspending medium. The inorganic particles are substantially deposited on and adhered to the microcapsules.

DETAILED DESCRIPTION OF THE INVENTION

The process of this invention involves the production of hot melt coating compositions containing microcapsules and additionally containing inorganic pigment particles. Hot melt coating compositions comprising waxes and/or resinous materials and microcapsules when applied to paper substrates have been found to produce transparent or translucent coatings having a shiny surface. Additionally, the particular wax or resinous material may have a noticeable color difference from that of the paper substrate. This is particularly true when white paper substrates are used since many hot melts have a slight yellowish color. In this invention, the inclusion of white pigments in the hot melt coating compositions produces a coating on the paper substrate which is scarcely visible. The process of this invention deals with a method of incorporating such pigments in particulate form in the hot melt coating composition prior to its application to a paper substrate. The process comprises, adding the desired pigment particles with low shear mixing to an aqueous dispersion of the microcapsules, spray drying the combined dispersion and dispersing by low shear mixing the powder formed by spray drying into hot melt suspending medium.

The coating compositions produced by the process of this invention are dispersion of microcapsules coated with the pigment particles in a hot melt suspending medium. On applying the coating compositions of this invention to a substrate and allowing the composition to set by cooling, the hot melt suspending medium acts as a binder for the microcapsules to facilitate adherence of the microcapsules to the substrate. Microcapsules containing pharmaceutical agents, aromas, perfumes, flavoring agents, insecticides, dyes, pigments and color precursors may be used in the process of this invention and coated on a variety of substrates including papers, fabrics and plastic films.

A preferred embodiment of this invention is the production of hot melt microcapsular coating compositions which may be used in the preparation of pressure-sensitive carbonless copy papers. The preparation of these carbonless copy papers is described in detail in a commonly-assigned, co-pending application entitled, "Pressure-Sensitive Carbonless Transfer Sheets Using Novel Hot Melt Systems and Process for the Production Thereof", U.S application Ser. No. 747,682 filed Dec. 6, 1976 described supra, which application is incorporated herein by reference. The process of this invention will hereinafter be described in detail with respect to this preferred embodiment.

In the preferred embodiment, the hot melt coating composition is essentially a dispersion of an encapsulated chromogenic material in a hot melt system. For purposes of this invention, "chromogenic material" will refer to color precursors, color formers, color developers and the like. The encapsulated chromogenic material is usually an oil solution of one or more color precursors. The coating composition can contain, in addition to the encapsulated chromogenic material, fillers, stilt material such as Arrowroot starch granules and dispersing agents. The type and amount of such additional ingredients in the coating composition are strictly a matter of choice and are generally dependent on the desired final product.

The inorganic pigments which can be used in this invention are the pigments normally used for filling or coating paper. For example, particulate titanium dioxide, calcium carbonate and the paper coating clays, such as the kaolin clays, can be used. Titanium dioxide pigment particles are preferred. The pigments can be tinted by the use of organic dyes if the resultant coating composition is to be coated on a tinted substrate. The size of the pigment particles are preferably from about 0.1 microns to about 2 microns.

The amount of pigment to be used in the coating composition would vary with the intensity of the color of the hot melt and the character of the coating surface. The pigments useful in this invention can be added in amounts from about 0.1% to about 20% by weight based on the weight of the microcapsules. A more preferred range is from about 1% to about 15% and a most preferred range is from about 2% to about 10%.

Although any of the color precursors or color formers known in the prior art can be used, the color precursors most useful in the practice of the preferred embodiment of this invention are the color precursors of the electron-donating type. The preferred group of electron donating color precursors include the lactone phthalides, such a crystal violet lactone, and 3,3-bis-(1'ethyl-2-methylindol-3'-yl) phthalide, the lactone fluorans, such as 2-dibenzylamino-6-diethylaminofluoran and 6-diethylamino-1,3-dimethylfluorans, the lactone xanthenes, the leucoauramines, the 2-(omega substituted vinylene)-3, 3-disubstituted-3-H-indoles and 1,3,3-trialkylindolinospirans. Mixtures of these color precursors can be used if desired. In the preferred process of this invention, microencapsulated oil solutions of color precursors are used. The color precursors are preferably present in such oil solutions in an amount of from about 0.5% to about 20.0% based on the weight of the oil solution, and the most preferred range being from about 2% to about 7%.

In the practice of this invention the microcapsules are prepared in the form of a dispersion in an aqueous solvent. In general, the more uniform the microcapsular dispersion, the better the final product.

The hot melt suspending media generally useful in the practice of this invention are those disclosed in U.S. application Ser. No. 747,682 filed Dec. 6, 1976 described supra. These media include waxes and resins. A preferred group of compounds useful as hot melt suspending media include: deresinated, oxidized mineral waxes such as the montan waxes, amide waxes such as bisstearamide wax, stearmide wax, behenamide wax, fatty acid waxes, hydroxylated fatty acid waxes, hydroxy stearate waxes, oxazoline waxes and mixtures thereof.

Another type of hot melt suspending media is a nonpolar hydrocarbon wax, such as Be Square 170/175 from Bareco Division of Petrolite Corporation which includes a small amount of a dispersing agent. The dispersing agent may, for instance, be sulfated castor oil, more commonly known as Turkey Red Oil.

A characteristic of the preferred hot melt suspending media useful in the practice of this invention is a melting point of from about 60° C. to about 140° C. A more preferred melting point for the waxes or resins useful in the practice of this invention is from about 70° C. to about 100° C. Also relative to the melting point, it is necessary for the coating composition of this invention to set rapidly after application to the particular substrate. More particularly, a practical melting range limitation, or in other words range of temperature in which the liquid hot melt composition sets into a solid composition, is from about 1.0° C. to about 15° C.

The hot melt waxes and resins useful in this invention preferably also have a low viscosity when in a molten state in order to facilitate ease of spreading on a substrate. In general, it is desirable that the hot melt suspending media have a viscosity of less than about 120 centipoises at a temperature of approximately 5° C. above the melting point of a particular hot melt suspending medium. In addition, it is preferred that the hot melt wax or hot melt suspending media of this invention have a light color in order to be compatible with the final paper or plastic product being produced. This means that it is preferred for the hot melt to be white or transparent after application to the particular substrate being coated.

The preferred waxes, resins and other hot melt suspending media of this invention preferably are polar. By polar it is meant that the preferred waxes are characterized by a certain amount of polarity, the polar compositions being characterized by the presence of functional groups selected from the group consisting of: carboxyl, carbonyl, hydroxyl, ester, amide, amine, heterocyclic groups and combinations thereof.

The particular wall-forming materials or the particular encapsulated chromogenic materials are not asserted to be an inventive feature herein. Rather, there are described in the patent literature various capsular chromogenic materials which may be used. Such chromogenic materials have been encapsulated in gelatin wall-forming materials (see U.S. Pat. Nos. 2,730,456 and 2,800,457) including gum arabic, polyvinyl, alcohol, carboxymethylcellulose, resorcinol-formaldehyde wall-formers (see U.S. Pat. No. 3,755,190), isocyanate wall-formers (see U.S. Pat. No. 3,914,511) isocyanate-polyol wall-formers (see U.S. Pat. No. 3,796,669) and hydroxypropylcellulose (see commonly-assigned U.S. Pat. No. 3,024,455) in addition to mixtures of the above. Microencapsulation has been accomplished by a variety of known techniques including coacervation, interfacial polymerization, polymerization of one or more monomers in an oil, various melting, dispersing and cooling methods. Compounds which have been found preferable for use as wall-forming materials in the various microencapsulation techniques included: hydroxypropylcellulose, methylcellulose, carboxymethylcellulose, gelatin, melamine-formaldehyde, polyfunctional isocyanates and prepolymers thereof, polyfunctional acid chlorides, polyamines, polyols, epoxides and mixtures thereof. Particularly well-suited to use in the present invention are microcapsules of hydroxypropylcellulose (HPC) material and isocyanate-polyol materials. The HPC and isocyanate-polyol capsules have good permeability, strength, and temperature characteristics.

The microcapsules as described above are prepared by dispersing an oil in an aqueous continuous phase and forming and hardening the capsule walls while still in the aqueous continuous phase. In the preparation of hot melt compositions from these aqueous dispersions of microcapsules, the aqueous continuous phase must be replaced with a hot melt suspending medium. It is under these conditions that the full advantages of the process of this invention can be realized.

Prior to removal of the water from the aqueous dispersion of microcapsules, inorganic pigment particles can be conveniently added to the aqueous dispersion by blending together an aqueous dispersion of the pigment particles with the aqueous dispersion of microcapsules by low shear mixing as by a paddle stirrer. The aqueous dispersion of pigment can be prepared by any convenient method, such as by kneading or by high-speed, low-shear stirring. Alternatively, the dry pigment particles can be stirred into the aqueous dispersion of microcapsules using high-speed low-shear mixing. Water is then removed from the aqueous dispersion of microcapsules and pigment particles by spray drying. This is accomplished by spraying the dispersion into a heated atmosphere, such as chamber which chamber is provided with a flow of hot air. The dispersion is dried leaving a free-flowing dry powder of microcapsules coated with pigment particles. The inorganic pigment particles are substantially deposited on and adhered to the microcapsules. The resultant dry powder is removed from the chamber and can be easily redispersed in a liquid (melted) hot melt suspending medium by low shear mixing.

The coating compositions produced by the process of this invention are smooth and lump free as compared to coating compositions wherein the dry pigment is directly dispersed in the hot melt containing microcapsules. In the latter instance, the dry pigment particles are not easily wetted by the hot melt under low shear agitation. High shear mixing, such as kneading or milling, is to be avoided due to the presence of microcapsules in the heated hot melt composition. Both the heat and high shear conditions tend to rupture or otherwise deteriorate the microcapsules.

In the preferred embodiment of this invention the hot melt coating composition may have additives included in the coating composition. Typically, stilting material such as arrowroot starch may be added. The composition so formulated, may be applied to a continuous web substrate by any ordinary coating or printing means such as by heated roll or blade coating or by gravure or flexographic printing. The hot melt sets to solids coating by cooling.

The following examples further illustrate but do not limit the invention.

EXAMPLE 1

An aqueous dispersion of HPC microcapsules was made as follows: All amounts are in parts by weight.

A carrier oil solution of color precursors was prepared by dissolving 53.2 parts of crystal violet lactone, 6.9 parts grams of 3,3-bis-(1'-ethyl-2'-methylindol-3-yl) phthalide, 3.5 parts of 3-N,N-diethylamino-7-(N,N-dibenzylamino)fluoran, and 16.1 parts of 3-N,N-diethylamino-6,8-dimethylfluoran in 1142 parts of monoisopropylbiphenyl (MIPB) at 90° C. This oil solution was then cooled to 11° C. To this carrier oil solution was added 50 parts of Desmodur N-100 (a liquid biuret reaction product of hexamethylene diisocyanate and water in 3 to 1 molar ratio made and sold by Mobay Chemical Co.), 18 parts of NIAX SF-50 (a trifunctional aromatic polyurethane prepolymer having a free isocyanate content of 32.5% made and sold by Union Carbide) and 0.50 parts of dibutyl tin dilaurate catalyst.

An aqueous solution of hydroxypropylcellulose was prepared by dissolving 50 parts of hydroxypropylcellulose in 2082 parts of distilled water at room temperature. The carrier oil solution was emulsified into the aqueous solution of hydroxypropylcellulose for about 45 minutes. The resultant emulsion was heated to 47° while stirring and the temperature was maintained between 47° C. and 50° C. for a period of 2 hours to form the microcapsules.

The dispersion of microcapsules as prepared above at about 40% microcapsules in water was mixed with an aqueous slurry of titanium dioxide particles (Titanium dioxide, RG-Dupont) containing 50% titanium dioxide solids in water. The percent by weight of titanium dioxide was 7% of the microcapsules. The aqueous slurry of titanium dioxide had been previously prepared by stirring the titanium dioxide particles into water using a paddle stirrer.

The combined dispersion of microcapsules and titanium dioxide pigment particles was spray dried in a Bowen Conical Spray Drier which sprayed the combined dispersion into a cross flow of heated air at about 300° C. The dried microcapsules were collected at the bottom of a cyclone separator. 10 parts by weight of the microcapsules medium of 18.4 parts of an oxazoline wax (Oxawax TS-254AA-Commercial Solvents Corporation, Terre Haute, Indiana), and 4.6 parts of a deresinated oxidized montan wax (Hoechst Wax S—American Hoechst Corp., Sommerville, New Jersey). A very smooth, white hot melt coating composition was produced. The coating composition was applied to a paper substrate with a heated Mayer bar. A white coated sheet was obtained which gave a clear, blue typed image when used with a novolac resin coated record sheet.

EXAMPLE 2

Example 1 was repreated except that in place of 7% titanium dioxide, 2% calcium carbonate (Purecal O—Wyandotte Chemicals Inc.) based on the dry weight of the microcapsules was used.

The microcapsules coated with calcium carbonate dispersed readily to a smooth mixture. In comparison, when dry calcium carbonate pigment was added to the hot melt suspending medium, the calcium carbonate pigment particles did not completely disperse.

EXAMPLE 3

Example 1 was repeated except that in place of 7% titanium dioxide, 2% coating clay (Hydrasperse—Engelhard Clay and Minerals) based on the dry weight of the microcapsules was used.

The microcapsules coated with Hydrasperse clay dispersed readily to a smooth mixture. In comparision, when Hydrasperse clay was added to the hot melt suspending medium, the clay particles did not completely disperse.

What is claimed is:

1. A process for the production of hot melt coating compositions containing microcapsules and inorganic pigment particles comprising:
   (a) preparing an aqueous dispersion of microcapsules;
   (b) adding inorganic pigment particles to said aqueous dispersion of said microcapsules with mixing, said inorganic pigment particles being added in an amount from about 0.1% to about 20% by weight based on the weight of said microcapsules;
   (c) spraying said dispersion of said microcapsules and said inorganic pigment particles into a heated atmosphere, thereby drying said dispersion and producing a free-flowing powder of said microcapsules, said inorganic pigment particles being substantially deposited on and adhered to said microcapsules; and
   (d) dispersing said free-flowing powder of said microcapsules having said inorganic pigment particles deposited thereon in a liquid hot melt suspending medium.

2. The process of claim 1 wherein said inorganic pigment particles are dispersed in water and added as an aqueous dispersion of said inorganic pigment particles to said aqueous dispersion of said microcapsules.

3. The process of claim 1 wherein said inorganic pigment particles are selected from the group consisting of titanium dioxide particles, calcium carbonate particles and paper coating kaolin clay particles.

4. The process of claim 1 wherein said microcapsules have capsule walls of one or more wall-forming compounds, said one or more wall-forming compounds being selected from the group consisting of: hydroxypropylcellulose, carboxymethylcellulose, gelatin, methylcellulose, melamine-formaldehyde, polyfunctional isocyanates and prepolymers thereof, polyfunctional acid chlorides, polyamines, polyols, expoxides and mixtures thereof.

5. The process of claim 1 wherein said microcapsules contain an oil solution of a chromogenic material.

6. A process for the production of hot melt coating composition containing microcapsules and inorganic pigment particles comprising:
   (a) preparing an aqueous dispersion of microcapsules, said microcapsules having capsule walls of cross-linked hydroxypropylcellulose;
   (b) adding titanium dioxide particles to said aqueous dispersion of said microcapsules, with mixing, said titanium dioxide particles being from about 0.1% to about 20% by weight, based on the weight of said microcapsules;
   (c) spraying said dispersion of said microcapsules and said titanium dioxide particles into a heated atmosphere, thereby drying said dispersion and producing a free-flowing powder of said microcapsules, said titanium dioxide particles being substantially deposited on and adhered to said microcapsules; and
   (d) dispersing said free-flowing powder of said microcapsules having said titanium dioxide particles deposited thereon in a liquid hot melt suspending medium to form a liquid hot melt coating composition.

7. The process of claim 6 wherein said microcapsules contain an oil solution of a chromogenic material.

8. A process for the production of pressure-sensitive carbonless transfer papers comprising:
   (a) preparing an aqueous dispersion of microcapsules, said microcapsules containing an oil solution of a chromogenic material, said microcapsules having capsule walls of cross-linked hydroxypropylcellulose, said chromogenic material comprising at least one color precursor of the electron-donating type;
   (b) adding inorganic pigment particles to said aqueous dispersion of said microcapsules with mixing, said inorganic pigment particles being added in an amount from about 0.1% to about 20% by weight based on the weight of said microcapsules;
   (c) spraying said dispersion of said microcapsules and said inorganic pigment particles into a heated atmosphere, thereby drying said dispersion and producing a free-flowing powder of said microcapsules, said inorganic pigment particles being substantially deposited on and adhered to said microcapsules;
   (d) dispersing said free-flowing powder of said microcapsules having said inorganic pigment particles deposited thereon in a liquid hot melt suspending medium to form a liquid hot melt coating composition; and
   (e) applying said liquid hot melt coating composition to a paper substrate.

9. The process of claim 8 wherein said inorganic pigment particles are titanium dioxide pigment particles.

10. A coating composition comprising microcapsules, from about 0.1% to about 20%, by weight, inorganic pigment particles based on the weight of said microcapsules and a hot melt suspending medium, said inorganic pigment particles being substantially deposited on and adhered to said microcapsules.

11. The coating composition of claim 10 wherein said microcapsules contain an oil solution of a chromogenic material, said chromogenic material comprising at least one color precursor of the electron-donating type.

12. The coating composition of claim 10 wherein said inorganic pigment particles are titanium dioxide pigment particles.

13. A pressure-sensitive carbonless transfer sheet wherein said coating composition of claim 11 is coated on a paper substrate.